Nov. 29, 1955                H. SCHROEDER                2,725,042
                        FLUID COOLED TUBULAR PANELS
Filed Jan. 5, 1955                                    4 Sheets-Sheet 1

INVENTOR
HENRY SCHROEDER
BY
       ATTORNEY

Nov. 29, 1955    H. SCHROEDER    2,725,042
FLUID COOLED TUBULAR PANELS
Filed Jan. 5, 1955    4 Sheets-Sheet 3

INVENTOR
HENRY SCHROEDER
BY
ATTORNEY

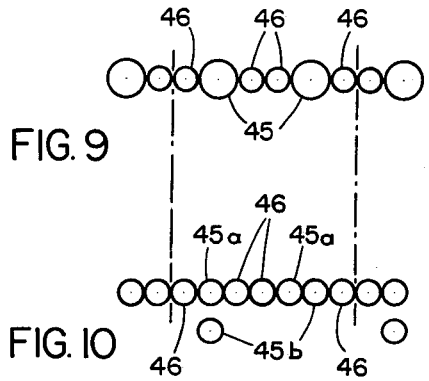
FIG. 9
FIG. 10
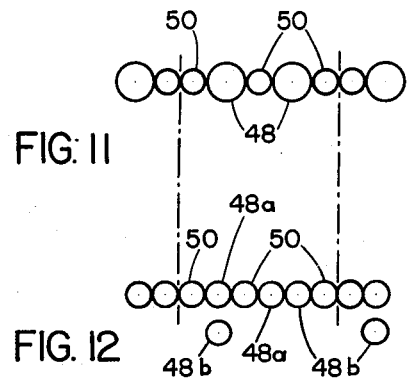
FIG. 11
FIG. 12
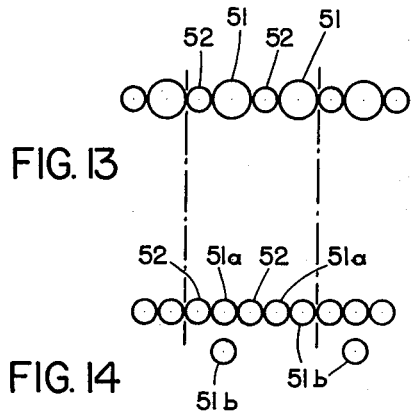
FIG. 13
FIG. 14
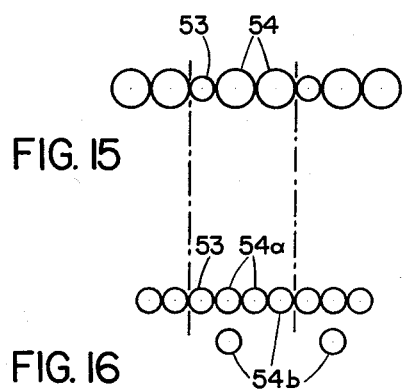
FIG. 15
FIG. 16
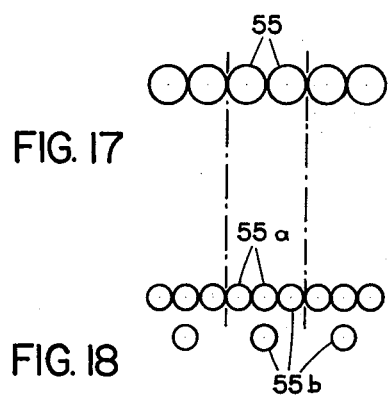
FIG. 17
FIG. 18

United States Patent Office 2,725,042
Patented Nov. 29, 1955

2,725,042

FLUID COOLED TUBULAR PANELS

Henry Schroeder, Jackson Heights, N. Y., assignor to Combustion Engineering, Inc., New York, N. Y., a corporation of Delaware Application January 5, 1955, Serial No. 479,896

7 Claims. (Cl. 122—235)

This invention relates to arrangements for extending fluid cooled wall tubes into a furnace or other chamber to cool combustion or other products therein and it contemplates that the fluid cooled tubes lining a furnace wall be novelly arranged to extend from the wall in rows or panels into the furnace to cool the products of combustion flowing therethrough.

By the use of such novelly organized rows of tubes or panels extending into a furnace the total fluid cooled heat absorbing surface of a given furnace may be substantially increased to thereby reduce the furnace leaving temperature of the products of combustion, or the size of the furnace may be reduced while maintaining the same furnace leaving temperature of the products.

Broadly stated the object of this invention is to provide a new and improved arrangement of some of the fluid cooled tubes facing a wall of a chamber to extend in rows or panels into the chamber to provide additional heat absorbing surface to cool products within the chamber while maintaining substantially a full protection of the wall adjacent the panels by the remaining wall cooling tubes.

Additional objects and advantages will become apparent from the following description of illustrative embodiments of the invention when read in conjunction with the accompanying drawings wherein.

Figure 7:
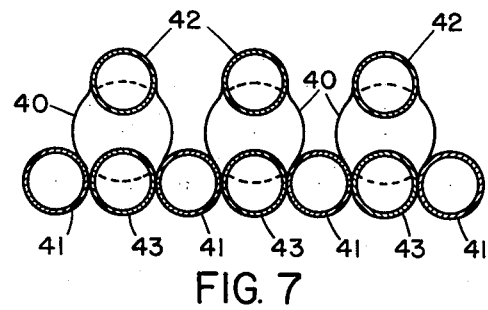
Fig. 7 is an enlarged section taken on line 7—7 of Fig. 4.
Figure 8:
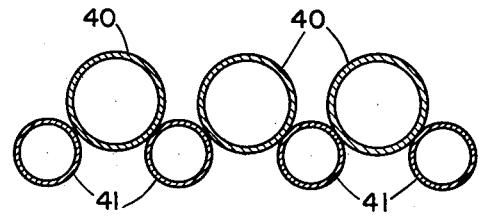
Fig. 8 is an enlarged section taken on line 8—8 of Fig. 4.

Figs. 9 through 18 illustrate different arrangements of water wall tubes making use of bifurcates in order to increase the number of tubes for forming panels projecting into the furnace. Of these Figs. 9, 11, 13, 15 and 17 are sections similar to Fig. 7 taken through the portion of the wall above the bifurcates and Figs. 10, 12, 14, 16 and 18 are sections similar to Fig. 8 taken through the wall portion below the bifurcates.

Figure 1:
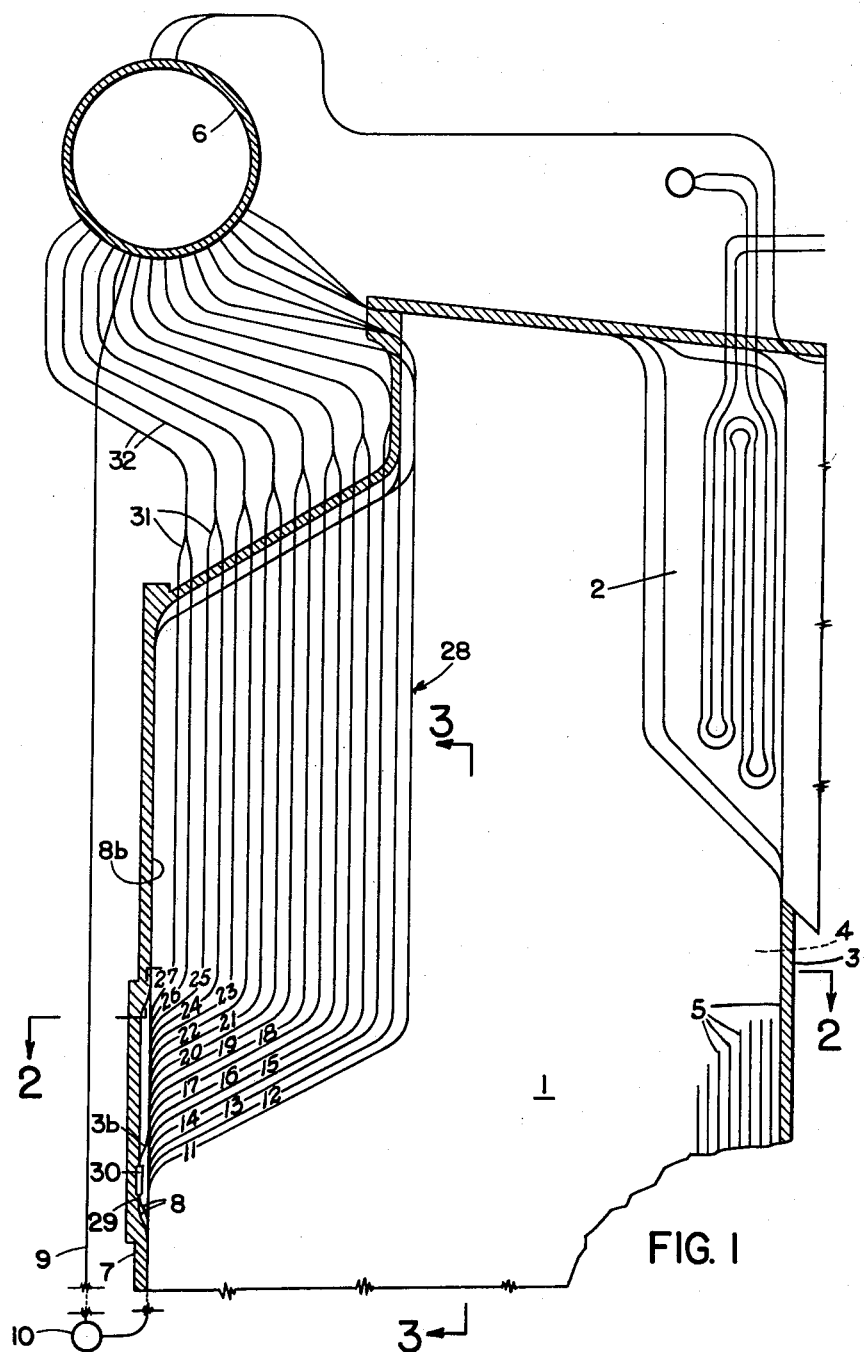
Fig. 1 is a vertical partial cross section through the upper portion of a furnace showing a panel of fluid cooled wall tubes extended into the furnace according to the invention.

Referring now to the embodiment of the invention disclosed in Fig. 1, the upper portion of a furnace generally designated as 1 is superimposed on a lower portion, not shown, containing fuel burning apparatus of any suitable type. The products of combustion rise to pass through the upper portion of the furnace 1 and thence through the offtake 2. The furnace wall 3 and the two opposite walls 4 may be lined with wall tubes 5 through which boiler water is circulated from the steam and water drum 6 and is evaporated and from which steam and water is returned to the drum 6.

The wall 7 (left of Figs. 1-2) is lined with steam generating wall tubes 8 which extend upwardly from the lower portion of the furnace in alignment in a plane along the face of the wall 7. Downcomer 9 connects to drum 6 and supplies boiler water to tubes 8 via header 10 to which tubes 8 are connected at their lower ends.

Within the upper portion of the furnace 1 certain alternate wall tubes 8 are bent within the plane of the wall tubes (Fig. 3) to the right and to the left. The group bent to the right are marked 11, 13, 15, 17, 19, 21, 23, 25 and the group bent to the left are marked 12, 14, 16, 18, 20, 22, 24, 26. The two groups of tubes thence extend upwardly inclined toward the tube marked 27 at their middle.

As each of the tubes of the group 11 to 25 nears the tube 27 it bends upwardly to the left and inwardly of the furnace into a plane extending into the furnace and containing tube 27. As each of the tubes of the group 12 to 26 nears the tube 27 it bends upwardly to the right and inwardly of the furnace into said plane containing tube 27. Preferably the tubes of one group entering said plane alternate with the tubes of the other group entering so that all of the tubes are arranged in numerical sequence within the plane as shown in Fig. 1. Each of the tubes then slopes upwardly and inwardly of the furnace within said plane extending into the furnace for a certain distance whence it bends upwardly and then extends parallel to the furnace wall 7 and in spaced relation to each of the remaining tubes of the groups.

In this manner there is formed a row of tubes (11 to 26) designated as panel 28 which extends into the furnace and is exposed to the heat of the products of combustion flowing through the furnace. Tube 27 which is a part of panel 28 rises from a lower tube 8 and continues straight up to a location just above where tube 26 bends to enter the panel thence it offsets inwardly of the furnace to align with the other tubes in panel 28.

To permit the alternate wall tubes 11 to 26 to pass toward the tube 27, or the plane of the panel 28, while lying within the plane of the wall tubes 8, the remaining wall tubes 8, between the alternate tubes 25 and 26, are bent into an offset 29 (Fig. 1), into the wall 7 just below the location where the alternate tubes 11 to 26 first bend toward the panel 28. Each of these offsets 29 is provided with a bifurcate 30 and two tubes 8b thence extend upwardly behind the tubes 11 to 26 and are bent from the offset position back into the plane of the wall tubes 8 just above the location where they cross behind tubes 25 or 26. As a result two tubes 8b occur on the wall above the inclined tubes 25 or 26 for each single tube 8 below the offset.

In this manner the gaps produced between wall tubes 8 by the removal of the alternate tubes 11 to 27 to form the panel 28, are replaced by the additional tubes 8b provided by the bifurcates 30. Consequently the portion of the furnace wall 7 adjacent the panel 28 has the same number of tubes 8b protecting it as the number of tubes 8 on the wall below the panel.

Figure 2:
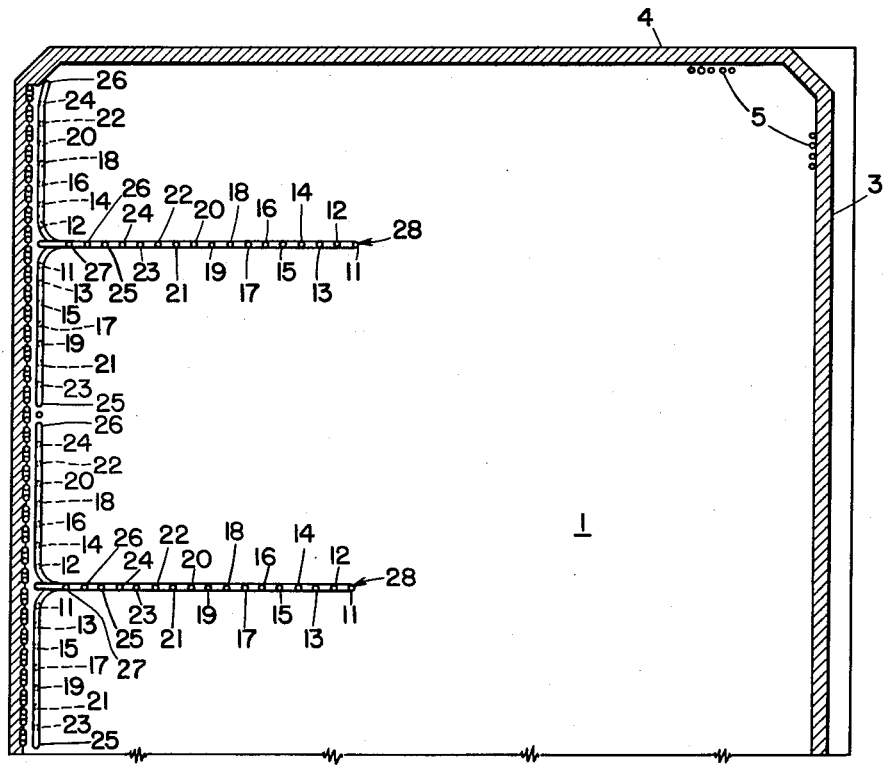
Fig. 2 is a horizontal cross section through a portion of the furnace taken on line 2—2 of Fig. 1.

Obviously two or more of such panels 28 (as shown in Fig. 2) may be extended at spaced intervals from a wall such as wall 7 and these panels may be parallel to each other, as Fig. 2 further shows.

The upper ends of the tubes 11 to 27 of the panel 28 may be grouped through bifurcates 31 (Fig. 1) into single risers 32 connecting into drum 6. Preferably the innermost tube 11 of panel 28 is carried directly into the drum 6 and not combined with another tube through a bifurcate into a single tube leading to the drum.

Figure 3:
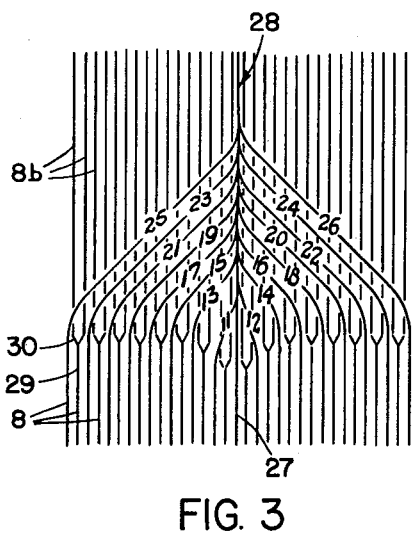
Fig. 3 is a vertical fragmentary section taken on line 3—3 of Fig. 1 showing an end view of one of the panels of fluid cooled tubes extending into the furnace.

In Figs. 4, 5, 6, 7 and 8 there is illustrated another embodiment of the invention wherein the offset in the furnace wall necessitated by the bifurcate 30 of Figs. 1 and 3 is eliminated. Furthermore the cross-sectional area of the bifurcated tubes may be so proportioned that for a given pressure approximately the same amount of water flows through each of the tubes forming the wall extension panel 28 and through those forming the upper portion of wall 7.

Figure 4:
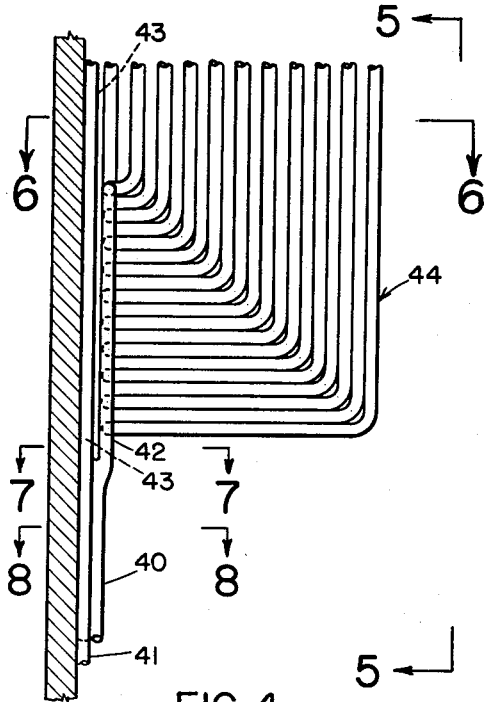
Fig. 4 is an elevational partial section similar to a corresponding portion of Fig. 1 but showing another embodiment of the invention.
Figure 5:
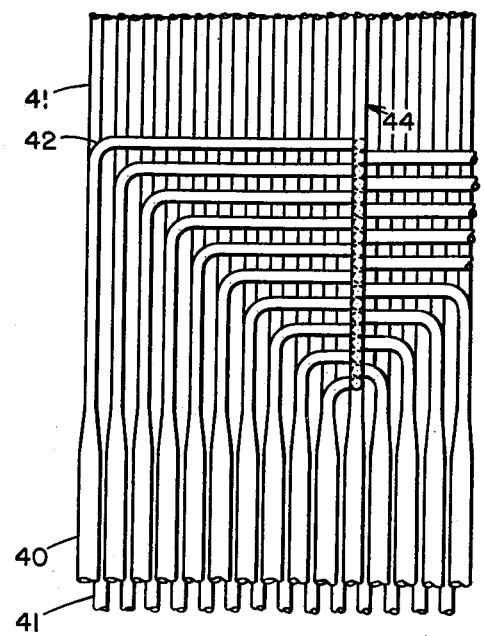
Fig. 5 is a view similar to Fig. 3 and taken on line 5—5 of Fig. 4.
Figure 6:
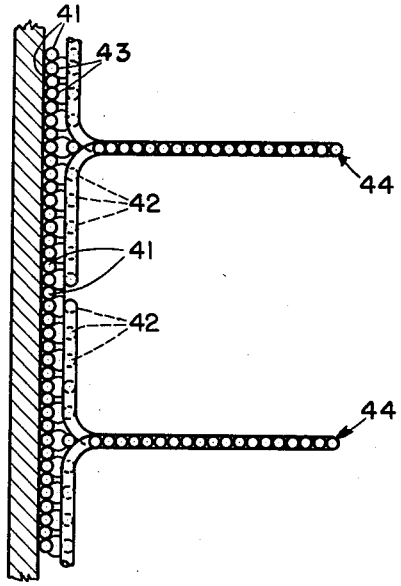
Fig. 6 is a plan section taken on line 6—6 of Fig. 4.

Referring now to Figs. 4 and 5, the lower portion of the furnace wall is lined with pairs of tubes 40 and 41. At the desired elevation tube 40 is bifurcated into tubes 42 and 43. Each pair of tubes 40 and 41 therefore is being transformed into three tube extensions or flow channels 41, 42 and 43. A group of tubes comprising tube extensions 42 (see Figs. 5 and 6) are bent right or left toward the plane of the tube panel 44 to be formed into extension panels 44 in a manner similar to the one earlier described in forming panel 28 in connection with the embodiment shown in Figs. 1, 2 and 3.

In Figs. 9 through 18 are shown sectional diagrams of other wall tube arrangements which may be used to increase the number of flow paths for the purpose of forming panels such as 28 or 44. These different arrangements may be used to alter the depth of the panels and/or to vary the number of panels for a given wall width for adaption of the furnace heating surface to various design conditions.

Thus, for example, a group of 6 tubes, as shown in Fig. 9, of which two tubes 45 are of 1½" diameter and four tubes 46 are of 1" diameter may, after the 1½" diameter tubes are bifurcated into tubes 45a and 45b, yield 8 flow channels (see Fig. 10), seven channels or extensions 46, 45a, 46, 46, 45a, 45b, 46 forming the lining of the furnace wall portion adjacent the projecting panel and one tube extension 45b being utilized together with similar tubes of other adjacent groups to form panels such as 28 and 44.

In a similar fashion, in Figs. 11 and 12 is shown an arrangement wherein two large tubes 48 and three smaller tubes 50 are used to form six wall lining tubes 50, 48a, 50, 48a, 48b and 50, and one tube 48b to form an extension panel.

In Figs. 13 and 14 there are five wall lining tubes 52, 51a, 52, 51a, 51b for one panel tube 51b; in Figs. 15 and 16 there are four wall lining tubes 53, 54a, 54a, 54b for one panel tube 54b; and in Figs. 17 and 18 there are three wall lining tubes 55a, 55a and 55b for one panel tube 55b.

In practicing my invention of constructing tube panels projecting into the furnace, combinations of wall tubes other than those shown hereinabove may be used with variations in tube diameter as well as in number of bifurcated tubes to accommodate the requirements of panel depth and panel number for a given furnace width and given required heating surface.

While I have shown and described several preferred embodiments of my invention, it will be understood that such showing is illustrative rather than restrictive and that changes in construction, combination and arrangement of parts may be made without departing from the spirit and scope of the invention.

This application is a continuation in part of application Serial No. 424,333 filed April 20, 1954 now abandoned.

I claim:

1. In a chamber, a wall defining one side of said chamber; parallel fluid cooled tubes facing said chamber wall and constituting a lining wall which covers and protects the chamber wall; a group of alternate tubes in said lining wall constructed and arranged to extend into the chamber to provide a row of tubes which form a panel lying in a plane that projects into said chamber from said lining wall, substantially all of said group of alternate wall tubes being bent within the plane of said lining wall tubes to extend sidewise toward the plane of said projecting panel to a point closely adjacent thereto, thence all of said tubes of said group being bent into the said projecting panel plane into substantially parallel alignment; and each of the wall lining tubes between said alternate tubes being offset toward said chamber wall adjacent the portion of said sidewise extending alternate tubes and bifurcating in said offset portion into two tubes which face said chamber wall adjacent said projecting group of panel tubes whereby protection of said chamber wall by said lining wall tubes is substantially the same over the furnace wall's entire protected area.

2. In a chamber comprising a wall that defines one side of the chamber, the combination of parallel fluid cooled tubes facing said chamber wall and constituting a lining wall which covers and protects the chamber wall; a group of alternate tubes in said lining wall constructed and arranged to extend into the chamber to provide a row of tubes which form a panel lying in a plane that projects into said chamber from said lining wall, each tube of said group of wall tubes excepting a wall tube lying within the plane of said projecting panel being bent within the plane of said lining wall tubes to extend sidewise toward the plane of said projecting panel to a point closely adjacent thereto, thence all of said tubes of said group being bent into the said projecting panel plane into a substantially parallel alignment; and each of the wall lining tubes between said alternate tubes being offset toward said chamber wall adjacent the portion of said sidewise extending alternating tubes and bifurcating in said offset portion into two tubes which face said chamber wall adjacent said projecting group of panel tubes whereby the protection of said chamber wall by said lining wall tubes is substantially the same over the furnace wall's entire protected area.

3. In a furnace, a vertical wall defining one side of said furnace; parallel vertical fluid cooled tubes facing said furnace wall and constituting a lining wall which covers and protects the furnace wall; a group of alternate tubes in said lining wall constructed and arranged to extend into the furnace to provide a row of tubes which form a panel lying in a vertical plane that projects into said furnace at right angles from said lining wall, substantially all of said group of alternate wall tubes being bent within the plane of said lining wall tubes to extend sidewise toward the plane of said projecting panel to a point closely adajcent thereto, thence all of said tubes being bent to extend vertically within the said projecting panel plane in substantially parallel spaced alignment; and each of the vertical wall lining tubes between said alternate vertical tubes being offset toward said furnace wall adjacent the portion of said sidewise extending alternate tubes and bifurcating in said offset portion into two tubes which face said furnace wall adjacent said projecting group of panel tubes whereby the protection of said furnace wall by said lining wall tubes is substantially the same over the furnace walls' entire protected area.

4. In a chamber, a wall defining one side of said chamber; parallel fluid cooled tubes facing said chamber wall and constituting a lining wall which covers and protects the chamber wall; alternate tubes in said lining wall being bifurcated forming two tube extensions; a group of alternate tube extensions of said bifurcates constructed and arranged to extend into the chamber to provide a row of tubes which form a panel lying in a plane that projects into said chamber from said lining wall, substantially all of said group of alternate tube extensions being bent within the plane of said lining wall tubes to extend sidewise toward the plane of said projecting panel to a point closely adjacent thereto, thence all of said tubes of said group being bent into the said projecting panel plane into substantially parallel alignment; and each of the lining wall tubes between said bifurcated tubes and each of said remaining tube extensions joining in parallelly spaced relation to face said chamber wall adjacent said projecting group of panel tubes whereby protection of said chamber wall by said lining wall tubes is substantially the same over the furnace wall's entire protected area.

5. In a chamber, a wall defining one side of said chamber; parallel fluid cooled tubes facing said chamber wall and constituting a lining wall which covers and protects the chamber wall; alternate tubes in said lining wall being bifurcated and forming with one adjacent unbifurcated tube groups of three tube extensions; a series constituting every third of said tube extensions of said groups being constructed and arranged to extend into the chamber to provide a row of tubes which form a panel lying in a plane that projects into said chamber from said lining wall, substantially all of said series of tube extensions being bent within the plane of said lining wall tubes to extend sidewise toward the plane of said projecting panel to a point closely adjacent thereto; thence all of said tubes of said series being bent into the said projecting panel plane into substantially parallel alignment; and each of the remaining extensions of said groups continuing in spaced and parallel relation to form said lining wall.

6. In a chamber, a wall defining one side of said chamber; parallel fluid cooled tubes facing said chamber wall and constituting a lining wall composed of a lower portion and an adjacent upper portion and covering and protecting the chamber wall; certain of said tubes in said lining wall being bifurcated at a point adjacent the line where said upper and said lower wall portions meet thereby increasing by the number of bifurcates the total number of available flow channels formed by said tubes; and a selected group of said available flow channels being constructed and arranged to extend into the chamber to provide a row of tubes which form a panel lying in a plane that projects into said chamber from said lining wall, substantially all tubes of said selected group being bent within the plane of said lining wall tubes to extend sidewise toward the plane of said projecting panel to a point closely adjacent thereto, thence all of said tubes of said group being bent into the said projecting panel plane into substantially parallel alignment.

7. An apparatus according to claim 6 wherein said selected group comprises flow channels of the same number as the number of bifurcates.

References Cited in the file of this patent
UNITED STATES PATENTS

| | | |
|---|---|---|
| 1,842,235 | Barnes | Jan. 19, 1932 |
| 2,213,185 | Armacost | Sept. 3, 1940 |
| 2,244,144 | Drewry | June 3, 1941 |
| 2,570,073 | Reintjes | Oct. 2, 1951 |